(12) United States Patent
Mazur et al.

(10) Patent No.: US 12,210,927 B2
(45) Date of Patent: Jan. 28, 2025

(54) PRESENCE DETECTION USING RFID TAGS AND READERS

(71) Applicant: Carrier Corporation, Palm Beach Gardens, FL (US)

(72) Inventors: Mateusz Mazur, Gdańsk (PL); Nazar Krutskevych, Gdańsk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 4 days.

(21) Appl. No.: 18/151,159

(22) Filed: Jan. 6, 2023

(65) Prior Publication Data

US 2023/0222299 A1 Jul. 13, 2023

(30) Foreign Application Priority Data

Jan. 10, 2022 (EP) .................................... 22150811

(51) Int. Cl.
*G06K 7/10* (2006.01)

(52) U.S. Cl.
CPC ..... *G06K 7/10128* (2013.01); *G06K 7/10148* (2013.01)

(58) Field of Classification Search
None
See application file for complete search history.

(56) References Cited

U.S. PATENT DOCUMENTS

| 7,113,099 | B2 | 9/2006 | Tyroler et al. |
| 7,113,746 | B2 | 9/2006 | Payton et al. |
| 7,126,951 | B2 | 10/2006 | Belcea et al. |
| 7,358,888 | B2 | 4/2008 | Fullerton et al. |
| 7,369,047 | B2 | 5/2008 | Broad et al. |
| 7,733,220 | B2 | 6/2010 | Libby |
| 7,864,058 | B2 | 1/2011 | Kondo et al. |
| 8,138,918 | B2 | 3/2012 | Habib et al. |
| 8,526,341 | B2 | 9/2013 | Cover et al. |
| 8,710,984 | B2 | 4/2014 | Wilson et al. |

(Continued)

FOREIGN PATENT DOCUMENTS

| CN | 103777174 A | 5/2014 |
| CN | 113396558 A | 9/2021 |

(Continued)

OTHER PUBLICATIONS

Deak et al: "A Survey of Active and Passive Indoor Localisation Systems", Computer Communications, vol. 35, No. 16, Jun. 26, 2012, pp. 1939-1954.

(Continued)

*Primary Examiner* — Edwyn Labaze
*Assistant Examiner* — April A Taylor
(74) *Attorney, Agent, or Firm* — CANTOR COLBURN LLP

(57) ABSTRACT

A presence detection system (100) including: an RFID interrogator (102); and a plurality of passive RFID tags (11 to MN), the RFID interrogator (102) is configured to: measure a received signal strength indicator (RSSI) level from each of the plurality of passive RFID tags (11 to MN); compare a measured RSSI level to a reference RSSI level for each of the plurality of passive RFID tags (11 to MN); and determine whether a difference between the measured RSSI level and the reference RSSI level is greater than a threshold value.

15 Claims, 8 Drawing Sheets

(56) References Cited

U.S. PATENT DOCUMENTS

| | | |
|---|---|---|
| 8,742,927 B2 | 6/2014 | Olivier |
| 8,769,688 B2 | 7/2014 | Geigel |
| 8,890,677 B2 | 11/2014 | Raphaeli |
| 9,223,045 B2 | 12/2015 | Naqvi |
| 9,378,634 B1 | 6/2016 | Kashyap et al. |
| 9,390,302 B2 | 7/2016 | Bassan-Eskenazi et al. |
| 9,474,042 B1 | 10/2016 | Wootton et al. |
| 9,523,760 B1 | 12/2016 | Kravets et al. |
| 9,642,218 B1 | 5/2017 | Dureiko et al. |
| 9,659,474 B1 | 5/2017 | Kashyap et al. |
| 9,922,510 B2 | 3/2018 | Pavlich |
| 9,989,622 B1 | 6/2018 | Griesdorf et al. |
| 10,004,076 B1 | 6/2018 | Griesdorf et al. |
| 10,109,167 B1 | 10/2018 | Olekas et al. |
| 10,142,785 B2 | 11/2018 | Wootton et al. |
| 10,321,270 B2 | 6/2019 | Wootton et al. |
| 10,621,840 B2 | 4/2020 | Garg et al. |
| 11,043,094 B2 | 6/2021 | Ghourchian et al. |
| 11,077,826 B2 | 8/2021 | Lin et al. |
| 2005/0055568 A1 | 3/2005 | Agrawala et al. |
| 2017/0004334 A1* | 1/2017 | Vargo ............... G06Q 10/087 |
| 2018/0102032 A1 | 4/2018 | Emmanuel et al. |
| 2019/0005280 A1* | 1/2019 | Jones .................... G07G 1/009 |
| 2019/0035244 A1 | 1/2019 | Garg et al. |
| 2020/0200892 A1 | 6/2020 | Rajab et al. |
| 2021/0217284 A1 | 7/2021 | Agrawal et al. |

FOREIGN PATENT DOCUMENTS

| | | |
|---|---|---|
| EP | 2040234 A1 | 3/2009 |
| EP | 3401871 A1 | 11/2018 |
| JP | 2010218071 A | 9/2010 |
| JP | 2015121907 A | 7/2015 |
| KR | 101231481 B1 | 2/2013 |
| WO | 03021851 A2 | 3/2003 |
| WO | 2004068432 A1 | 8/2004 |
| WO | 2013029693 A1 | 3/2013 |
| WO | 2016023528 A1 | 2/2016 |
| WO | 2019190903 A1 | 10/2019 |

OTHER PUBLICATIONS

European Search Report for Application No. 22150811.2; Issued Jul. 5, 2022; 10 Pages.

* cited by examiner

PRESENCE DETECTION USING RFID TAGS AND READERS

FOREIGN PRIORITY

This application claims priority to European Patent Application No. 22150811.2, filed Jan. 10, 2022, and all the benefits accruing therefrom under 35 U.S.C. § 119, the contents of which in its entirety are herein incorporated by reference.

TECHNICAL FIELD OF INVENTION

The present disclosure relates to a presence detection system and a method for calibrating and using such a system. In particular, the present disclosure relates to a presence detection system comprising RFID tags and a method for operating and calibrating the presence detection system.

BACKGROUND OF THE INVENTION

The installation of a presence detection systems acts as a deterrence to intruders. Such systems are commonly installed in shops, offices, and indoor commercial districts. Common low-cost present detection systems typically use infrared (IR) sensors to detect the presence of an intruder. IR systems work by detecting IR radiation emitted from the body of an intruder. IR systems, however, are imprecise and may easily be masked by covering up the IR sensor with a metal sheet or otherwise so that the IR sensor cannot detect the IR radiation emitted by intruders, thereby allowing an intruder to bypass the IR detection system.

Other more sophisticated systems are available, such as those using multifunctional radars or thermal cameras. However, such systems are typically much more expensive than IR systems and these costs may be out of the reach of many small businesses.

Furthermore, presence detection systems capable of position estimation or people counting requires advanced signal processing. Such systems may have a high energy consumption due to the energy consumption of the particular sensors and processors required to perform this capability. High energy consumption has a disadvantage of increasing energy costs of the business running the presence detection system.

Many existing systems also use sensors that may be visible to potential intruders, thereby allowing intruders to identify the sensors and take measures to neutralise or bypass the presence detection system.

Therefore, there is a need for a presence detection system that is low-cost, has low energy consumption, and may be hidden from potential intruders.

SUMMARY OF THE INVENTION

According to a first aspect, the present invention provides a presence detection system comprising: an RFID interrogator; and a plurality of passive RFID tags, wherein the RFID interrogator is configured to: measure a received signal strength indicator (RSSI) level from one or more of the plurality of passive RFID tags; compare a measured RSSI level to a reference RSSI level for the one or more of the plurality of passive RFID tags; and determine, for the one or more of the plurality of passive RFID tags, whether a difference between the measured RSSI level and the reference RSSI level is greater than a threshold value.

Passive RFID (Radio Frequency Identification) tags do not have an internal power source. Instead, passive RFID tags are powered by electromagnetic waves received from another device, such as an RFID interrogator. The received electromagnetic waves induce a current in an antenna in the passive RFID tag to power the tag. That is, the RFID interrogator of the first aspect may be configured to send an electromagnetic signal for inducing a current in one or more of the plurality of passive RFID tags. Each of the plurality of RFID tags is addressable. For example, each passive tag may be assigned an address that identifies each passive RFID tag and enables the RFID interrogator to determine the position of each RFID tag. The address of each passive RFID tag may be fixed or it may be changed. The address of each of the plurality of passive RFID tags may be provided by the RFID interrogator or may be pre-programmed into each tag.

An advantage of using passive RFID tags may be that the passive RFID tags do not need to be individually powered by batteries or by a mains source, thereby reducing the time and cost required for maintenance of such tags.

An RFID interrogator (also known as a "reader") is a device capable of transmitting and receiving signals to and from RFID tags. The RFID interrogator may be configured to read a passive RFID tag. The RFID interrogator may be battery powered and/or mains powered.

Received Signal Strength Indicator (RSSI) is a measurement of the power of a received radio signal. In the present case, the RFID interrogator is configured to measure the RSSI level of each of the plurality of passive RFID tags. The RSSI level reduces with increased distance. The RSSI level of passive RFID tags is measured by the RFID interrogator. The RSSI level measured by the RFID interrogator may reduce with increasing distance between the RFID interrogator and a passive RFID tag, and it may also be reduced by objects in the line of sight between the RFID interrogator and a passive RFID tag. The degree to which the RSSI level is reduced by object(s) in the line of sight may be dependent on the material and the thickness of said objects. Objects do not necessarily need to be directly in the line of sight between the RFID interrogator and a passive RFID tag to impact the measured RSSI level of that passive RFID tag. Instead, an object proximate to the line of sight between the RFID interrogator and the passive RFID tag may impact the measured RSSI level of that passive RFID tag.

The reference RSSI level for each of the passive RFID tags may be measured and stored by the RFID interrogator when the room in which the presence detection system is placed in is empty of all people. The reference RSSI level may be regularly updated to account for changes in the room or rooms being monitored, e.g. due to furniture being added, moved or removed. The reference RSSI levels acts as a background measurement against which measured RSSI levels may be compared.

The presence detection system is capable of detecting the presence of intruders because, when an intruder passes through a space between the RFID interrogator and one of the plurality of RFID tags, the RSSI level measured for that passive tag will be modified relative to the reference RSSI level. The intruder need not necessarily be directly in the line of sight between the RFID interrogator and a RFID tag to influence the RSSI measured from that tag. Instead, the measured RSSI level may be influenced by an intruder being proximate to the line of sight between the RFID interrogator and the RFID tag. If the difference between the measured RSSI level and the reference RSSI level for one or more of the passive RFID tags is greater than the predefined threshold value, then this indicates an intruder may be present in the room.

Standard RFID protocols may be used for communications between the RFID interrogator and each of the plurality of passive RFID tags.

An advantage of the RFID presence detection system is that via the use of RFID in the system cannot be masked or evaded in the same way that IR presence detection systems can be. This is because, if the RFID interrogator or any of the tags are covered up, this would affect the RSSI level measured by the RFID interrogator for one or more of the passive RFID tags. Covering up the RFID interrogator or one of the passive RFID tags may result in a change in the measured RSSI level that would breach the threshold level. Therefore, it is more difficult for an intruder to bypass a RFID presence detection system over an infrared (IR) presence detection system.

A further advantage is that passive RFID tags and RFID interrogators are commonly and cheaply available, enabling a small business to make use of the advantages of the present invention without the high costs of other presence detection systems.

The RFID interrogator may measure an RSSI level, compare a measured RSSI level to a reference RSSI level, and determine whether a difference between the measured RSSI level and the reference RSSI level is greater than a threshold value for a subset of the plurality of passive RFID tags, for each of the passive RFID tags, or for all of the passive RFID tags. That is, the RSSI level for every passive RFID tag may not be measured as part of a single event. Instead, the RFID interrogator may measure and compare RSSI levels for subsets of the plurality passive RFID tags, where a subset may be determined by locations of the passive RFID tags.

The threshold value may be a predefined RSSI value or it may be defined by the RFID interrogator in situ. The threshold value may be set as a percentage of the reference RSSI level or it may be an absolute RSSI value or absolute difference in RSSI value. The threshold value may be about 5% of the reference RSSI level, or the threshold value may be set to 3%, 4%, 6%, 7%, 8%, 9%, 10% or more of the threshold RSSI level. RSSI levels may be measured in arbitrary units. The RFID interrogator may determine the threshold value during a calibration process for the system. The threshold value may be changed on the fly in response to environmental effects that affect the measured RSSI level. Such environmental effects may include temperature fluctuations.

The threshold RSSI value may be the same for each passive RSSI tag, or a subset of the plurality of passive RSSI tags may have a subset threshold value, where the subset threshold value is a different threshold value to the remainder of the passive RSSI tags. Alternatively, the threshold value may be determined individually for each passive RSSI tag.

The presence detection system may be configured to trigger an alarm if the difference between the measured RSSI level and the reference RSSI level is greater than the threshold value. The presence detection system may be configured to contact a security service or police services if the difference between the measured RSSI level and the reference RSSI level is greater than the threshold value.

There may be more than one threshold values set for any given passive RFID tag. Each threshold value may trigger one or more actions for each level breached by the measured RSSI value. For example, if a first threshold value is reached, an alert is sent to security personnel, and if a second threshold value is reached, then an alarm may be triggered.

The system may be configured to trigger an alarm only if the threshold value is reached for more than one passive RFID tag.

The RFID interrogator and passive RFID tags may communicate using one of: low frequency; high frequency; ultrahigh frequency; microwave frequency; or any other suitable frequency. An advantage of using higher frequency communications may be that greater precision can be achieved over lower frequencies. However, an advantage of using lower frequencies may be that electromagnetic energy can be more easily transferred from the RFID interrogator to more of the passive RFID tags at once.

The number of passive RFID tags may be 5 or more, 10 or more, or 20 or more. The specific number of tags used may be dependent on the location in which the system is deployed. That is, only a few tags may be necessary for a small room, but a larger shop may require a greater number of tags to sufficiently cover the space that the owner wishes to monitor.

The passive RFID tags may be positioned behind a wall or other object such that they are not visible from within the room being monitored. The RFID interrogator may be similarly hidden. An advantage of hiding the interrogator and/or tags in this way is that a potential intruder cannot then identify the locations of the interrogator and/or the tags, so cannot seek to disable or bypass them.

The passive RFID tags may alternatively be provided as a "smart dust", i.e. many hundreds or thousands of passive RFID tags. Such smart dust may be mixed in with paint for painting onto a wall or ceiling of the room to be monitored. This has an advantage of providing potentially thousands of passive RFID tags in a single room, meaning that the RFID interrogator may be capable of higher resolution monitoring of the room in which the smart dust is deployed. Each of the passive RFID tags in a smart dust may be microscopically small, and may be sufficiently small that they are not detectable by an observer without specialist tools.

The presence detection system may be configured to track, or support another security system in tracking, the position of individuals. As mentioned above, the passive RFID tags are addressable. This means that the RFID interrogator "knows" the position of each of the plurality of passive RFID tags. When an intruder is present and distorts the measured RSSI level of one or more of the passive tags, the RFID interrogator may be configured to check the positions of those passive RFID tags for which the measured RSSI levels are distorted. In doing so, the RFID interrogator may then be configured to determine the approximate location of the intruder. The accuracy of this embodiment may be dependent on the number of passive tags installed. That is, a greater number of passive tags may increase the accuracy of the location determination.

An advantage of position tracking for a presence detection system may be that, particularly in large rooms, security services can quickly determine and reach the location of the intruder.

The presence detection system may be configured to count the number of people entering or exiting a room in which the system is installed. The RFID interrogator may be configured to count persons entering or exiting one of the one or more rooms by detecting a change in a measured RSSI level proximate to an entrance to the one of the one or more rooms. That is, as a person enters or exits a room, that person will affect a measured RSSI value between the RFID interrogator and a passive RFID tag placed proximate to an entrance or exit of the room. This feature may have the advantage of allowing the presence detection system to track, or support another security system in tracking, the number of people in a room at any given time. This may be important in the event that the number of people in a room is capped at a predetermined number.

The presence detection system may be configured to identify RFID tags carried by authorised personnel and/or attached to cargo such that an alarm is not triggered when the authorised personnel and/or cargo enters the monitored space. Such tags may be passive RFID tags or active RFID tags. This may have an advantage of allowing security personnel or the movement of goods by authorised persons, for example, to move within a space monitored by the presence detection system without triggering an alarm.

The presence detection system may comprise an IR sensor. A presence detection system utilising RFID tags and an IR sensor may have an advantage of improved system versatility and improved capability of detecting intruders.

An installation and calibration process for the presence detection system may be described as follows. The presence detection system may be installed in one or more rooms. The installation step may comprise positioning the RFID interrogator and the plurality of passive RFID tags in predetermined locations in the one or more rooms. If the passive RFID tags are placed in predetermined locations, then they may have predefined addresses. Alternatively, some or all of the plurality of passive RFID tags may be placed in random or otherwise undefined locations.

After installation, the presence detection system may be calibrated. The calibration step comprises using the RFID interrogator to measure RSSI levels for each of the plurality of passive RFID tags. These measured RSSI levels may then be stored by the RFID interrogator as the reference RSSI levels. The RFID interrogator may store the reference RSSI levels on a local memory storage device or on an external server. The calibration step may take place automatically and at regular intervals to ensure that the reference RSSI levels remain updated. This may be of importance if objects in the room or rooms are added, moved or removed from the room or rooms, or if new objects are brought in to the room or rooms. This may be of particular importance in a shop or commercial area where stock regularly changes.

The RFID interrogator may comprise an internal storage medium to store the reference RSSI levels, or the storage medium may be external to the RFID interrogator.

An additional calibration step may comprise identifying, using the RFID interrogator, the addresses of each of the plurality of passive RFID tags and creates a map by assigning coordinates to each of the passive RFID tags. The map may be two dimensional or three dimensional. The additional calibration step may be carried out before or after the reference RSSI levels are determined.

The presence detection system may instead be described as a kit of parts. That is, another aspect of the invention may provide a kit of parts for a presence detection system, in particular for providing a presence detection system as described above in connection with the first aspect, the kit comprising an RFID interrogator, and a plurality of passive RFID tags. The RFID interrogator may be configured to function as discussed above with reference to the first aspect or optional features thereof. The RFID tags may be as discussed above in relation to the first aspect of optional features thereof. For example, the kit may comprise passive RFID tags that are provided as a "smart dust", as set out above i.e. many hundreds or thousands of small passive RFID tags.

According to a second aspect, the present invention provides a method of presence detection comprising using a presence detection system, the presence detection system comprising: an RFID interrogator; and a plurality of passive RFID tags, wherein the method comprises: using the RFID interrogator to measure a received signal strength indicator (RSSI) level from one or more of the plurality of passive RFID tags; comparing a measured RSSI level to a reference RSSI level for the one or more of the plurality of passive RFID tags; and determining, for the one or more of the plurality of passive RFID tags, whether a difference between the measured RSSI level and the reference RSSI level is greater than a predefined threshold value. The presence detection system may be as discussed above with reference to the first aspect or any of the optional features thereof.

The presence detection system may only be active at certain times, such as outside office hours or once the system has been turned on by a shop worker.

The RFID interrogator may measure an RSSI level, compare a measured RSSI level to a reference RSSI level, and determine whether a difference between the measured RSSI level and the reference RSSI level is greater than a threshold value for a subset of the plurality of passive RFID tags, for each of the passive RFID tags, or for all of the passive RFID tags. That is, the RSSI level for every passive RFID tag may not be measured as part of a single event. Instead, the RFID interrogator may measure and compare RSSI levels for subsets of the plurality passive RFID tags, where a subset may be determined by locations of the passive RFID tags.

According to a third aspect, the present invention provides a method of calibrating a presence detection system for a room, the presence detection system comprising: an RFID interrogator; and a plurality of passive RFID tags, wherein the method comprises: using the RFID interrogator to measure an RSSI level from one or more of the plurality of passive RFID tags, and storing, for the one or more of the plurality of passive RFID tags, the RSSI level as a reference RSSI level.

The presence detection system may be as discussed above with reference to the first aspect or any of the optional features thereof. The method of calibration may be performed during installation of the presence detection system, i.e. as a part of a commissioning process. Alternatively or additionally the method of calibration may be performed periodically during use of the presence detection system, e.g. to re-calibrate in order to adapt to changes in the room and/or to sensor drift or other changes in the system itself.

The method of calibration may be performed each time the presence detection system is turned on.

The RFID interrogator may measure an RSSI level and store the RSSI level as a reference RSSI level for a subset of the plurality of passive RFID tags, for each of the passive RFID tags, or for all of the passive RFID tags. That is, the RSSI level for every passive RFID tag may not be measured as part of a single event. Instead, the RFID interrogator may measure and compare RSSI levels for subsets of the plurality passive RFID tags, where a subset may be determined by locations of the passive RFID tags.

BRIEF DESCRIPTION OF THE DRAWINGS

Certain embodiments of the invention will now be described by way of example only and with reference to the accompanying drawings in which.

DETAILED DESCRIPTION OF THE INVENTION

Figure 1A:
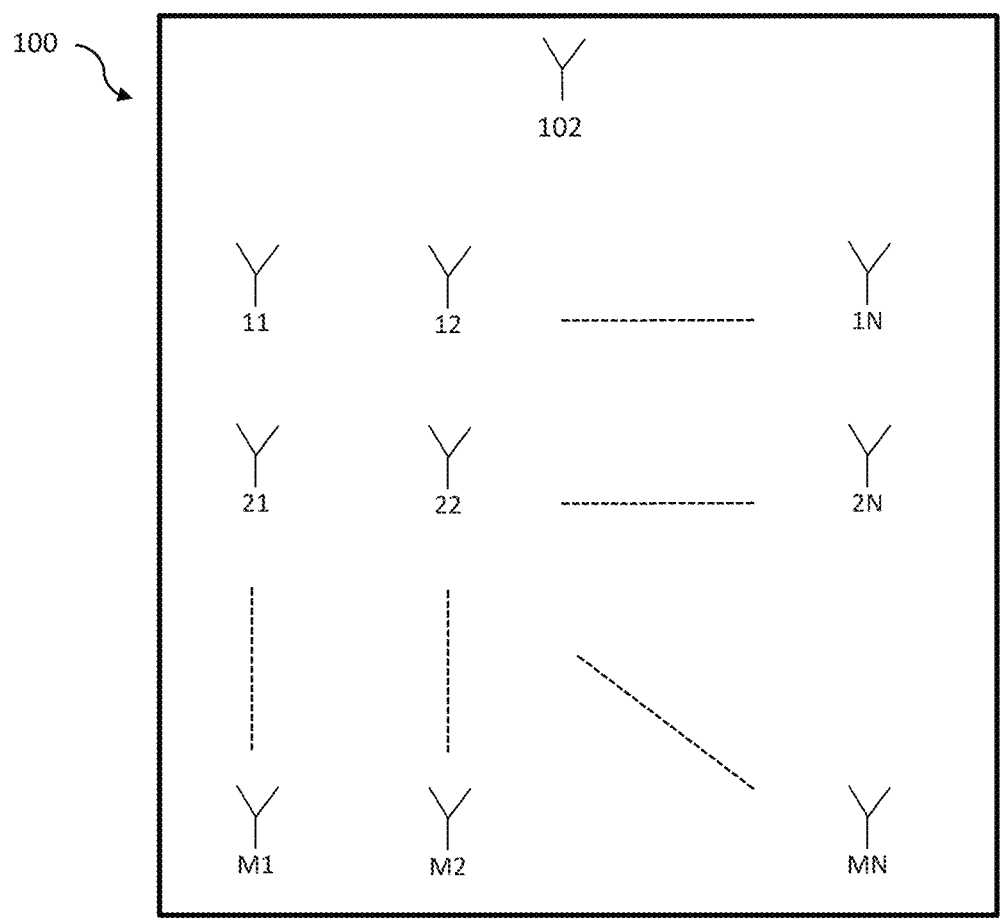
FIG. 1a shows a schematic floor map of a room in which a presence detection has been installed and in which a person is not present.

FIG. 1a illustrates a schematic floor map of a room in which a presence detection system 100 has been installed. The presence detection system comprises a RFID interrogator 102 and a plurality of passive RFID tags 11, 12, . . . , 1N, 21, 22, . . . , 2N, . . . , M1, M2, . . . , MN. In this Figure, the passive RFID tags are positioned beneath the floor of the room. The specific number of passive RFID tags is not defined and the system 100 may be scaled up or down depending on the size of the room and the desired density of RFID tags.

The RFID interrogator 102 may be positioned on a wall or ceiling of the room. The RFID interrogator knows or assigns addresses for each of the passive RFID tags 11 to MN. Since each passive RFID tag is addressable, the RFID interrogator is capable of associating specific data such as a measured RSSI level, a reference RSSI level, and a threshold value to each passive RFID tag.

The RFID interrogator 102 is configured to measure a received signal strength indicator (RSSI) level from each of the plurality of passive RFID tags 11 to MN. The RFID interrogator 102 is configured to compare the measured RSSI level for each passive RFID tag 11 to MN to a reference RSSI level for each passive RFID tag 11 to MN. Then, the RFID interrogator 102 is configured to determine whether a difference between the measured RSSI level and the reference RSSI level is greater than a threshold value for any given passive RFID tag.

As an example, the RFID interrogator 102 measures an RSSI level for the passive RFID tag 11. The measured RSSI level is compared to a previously stored threshold RSSI level by the RFID interrogator 102. A threshold value for the passive RFID tag 11 may be set to 5% of the threshold RSSI level. This means that the RFID interrogator 102 would determine whether the RSSI level measured by the RFID interrogator 102 for passive RFID tag 11 is over 5% above or below the threshold RSSI value for the passive RFID tag 11. If the measured RSSI value for any given RFID tag exceeds the threshold value, then an alarm may be triggered and/or security services called.

Figure 1B:
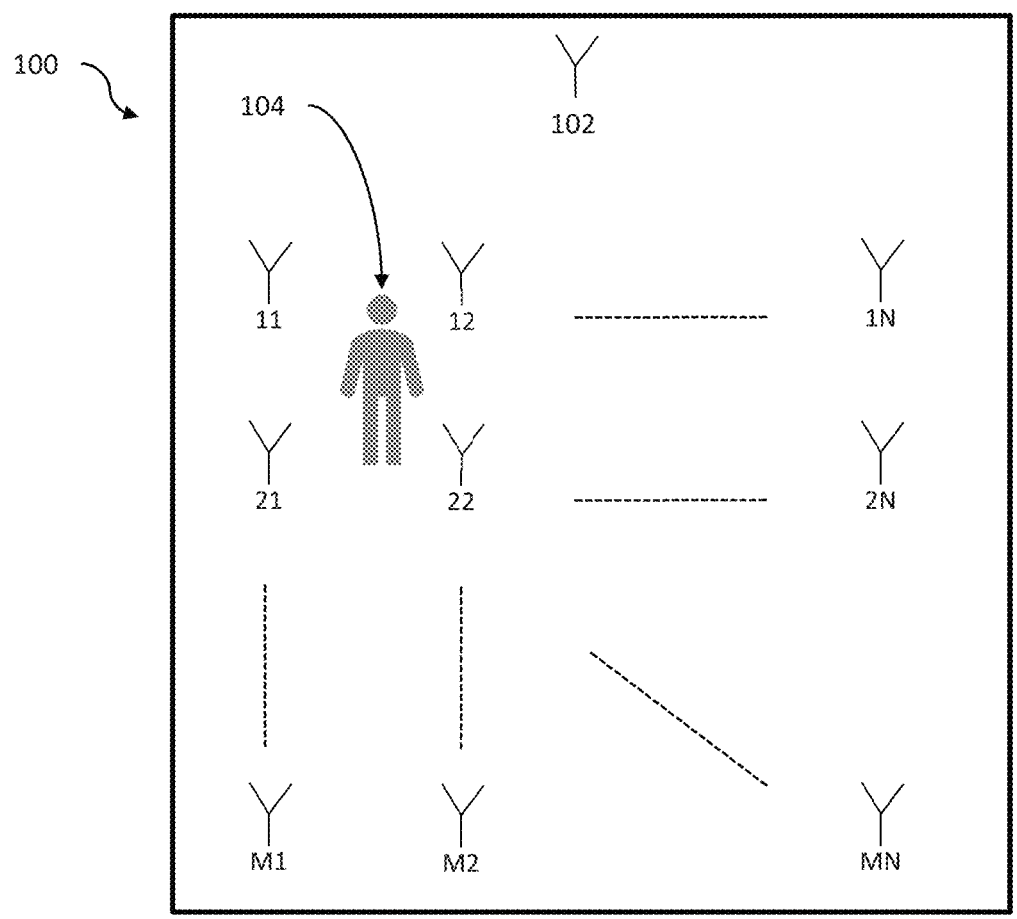
FIG. 1b shows the schematic floor map of FIG. 1a, but in which a person is present.

FIG. 1b shows the schematic floor map of FIG. 1a and its presence detection system 100, but in which a person 104 is present in the room. The presence of a person may impact the RSSI values of one or more of the plurality of passive RFID tags 11 to MN. In this Figure, the person 104 is standing at a position proximate to passive RFID tags 11, 12, 21, and 22.

Measured RSSI levels for passive RFID tags may be affected by a person or object moving in or near the line of sight between a passive RFID tag and the RFID interrogator 102. In the present situation, due to the position of the person 104, the measured RSSI levels of the passive RFID tags 11, 12, 21, and 22 may be impacted. The RFID interrogator 102 compares the measured RSSI levels for one or more of the passive RFID tags 11, 12, 21, and 22 with their respective reference RSSI values and determines whether the difference between the measured RSSI level and the reference RSSI level is greater than the threshold value for one or more of the passive RFID tags 11, 12, 21, and 22.

FIGS. 2a-d are a series of schematic drawings that illustrate specific embodiments of how the presence detection system may be installed.

Figure 2A:
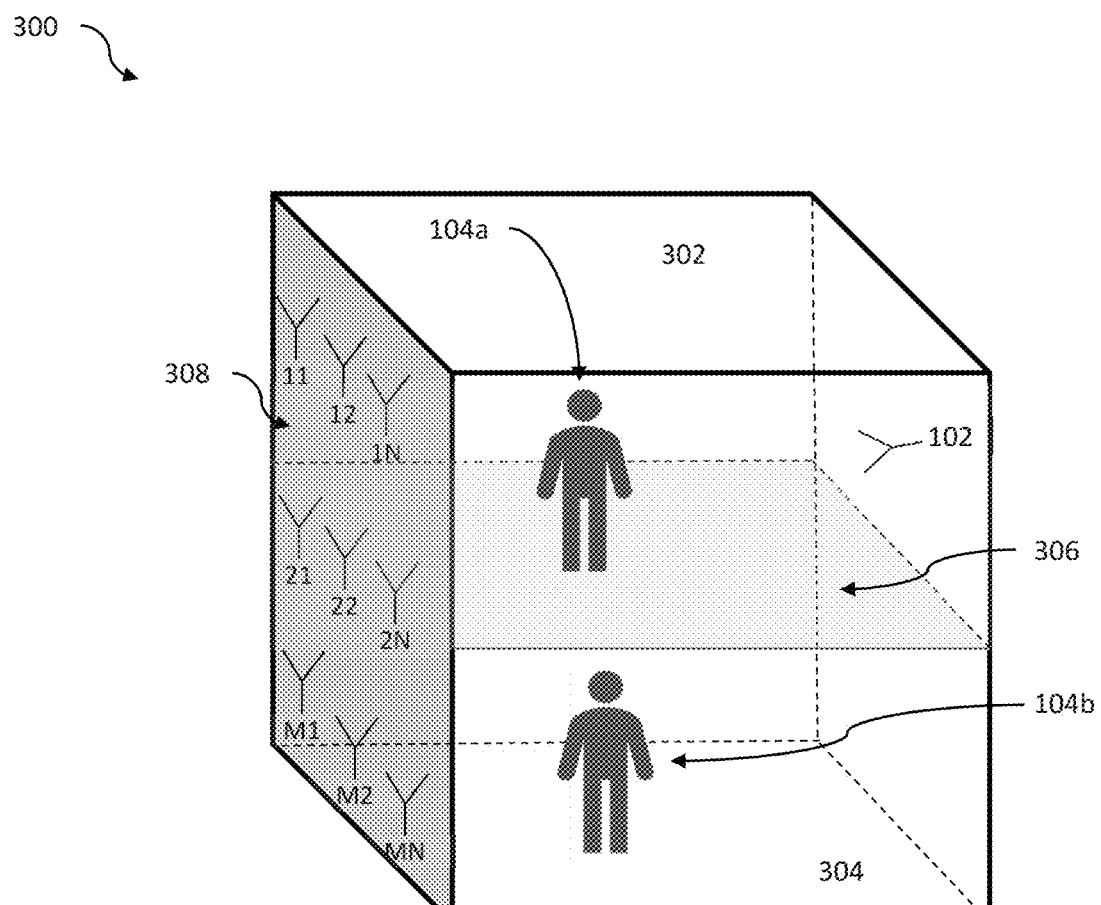
FIGS. 2a-d show various arrangements for a presence detection system.

In FIG. 2a, the presence detection system 300 comprises an RFID interrogator 102 and a plurality of passive RFID tags 11, 12, . . . , 1N, 21, 22, . . . , 2N, . . . , M1, M2, . . . , MN. As with the system 100 in FIG. 1, the specific number of passive RFID tags is not defined, and the system 300 may be scaled up or down depending on the size of the room and the desired density of RFID tags.

The system 300 is installed across two rooms 302 and 304, with a floor 306 separating the two rooms 302, 304. The upper room 302 is above the lower room 304. The RFID interrogator 102 is installed on a wall of the upper room 302. The plurality of passive RFID tags 11 to MN are distributed across a shared wall 308, where the wall is shared by upper room 302 and lower room 304.

FIG. 2a depicts a situation where there is a first intruder 104a in the upper room 302 and a second intruder 104b in the lower room 304. Each person 104a, 104b may impact the measured RSSI levels of different passive RFID tags 11 to MN. For example, the first intruder 104a in the upper room 302 may be in or proximate to the line of sight between the RFID interrogator and the passive RFID tags 11, 12, 1N, 21, 22, and 2N. The RFID interrogator 102 compares the measured RSSI levels for each of the passive RFID tags 11, 12, 1N, 21, 22, and 2N with their respective reference RSSI values and determines whether the difference between the measured RSSI level and the reference RSSI level is greater than the threshold value for each passive RFID tag 11, 12, 1N, 21, 22, and 2N. In this way, the presence detection system 300 would be able to detect the first intruder 104a in the upper room 302.

Similarly, the second intruder 104b in the lower room 304 may be proximate to the line of sight between the RFID interrogator 102 and the passive RFID tags M1, M2, and MN. The RFID interrogator 102 compares the measured RSSI levels for one or more of the passive RFID tags M1, M2, and MN with their respective reference RSSI values and determines whether the difference between the measured RSSI level and the reference RSSI level is greater than the threshold value for one or more of the passive RFID tags M1, M2, and MN. In this way, the presence detection system 300 would be able to detect the second intruder 104b in the lower room 304.

Figure 2B:
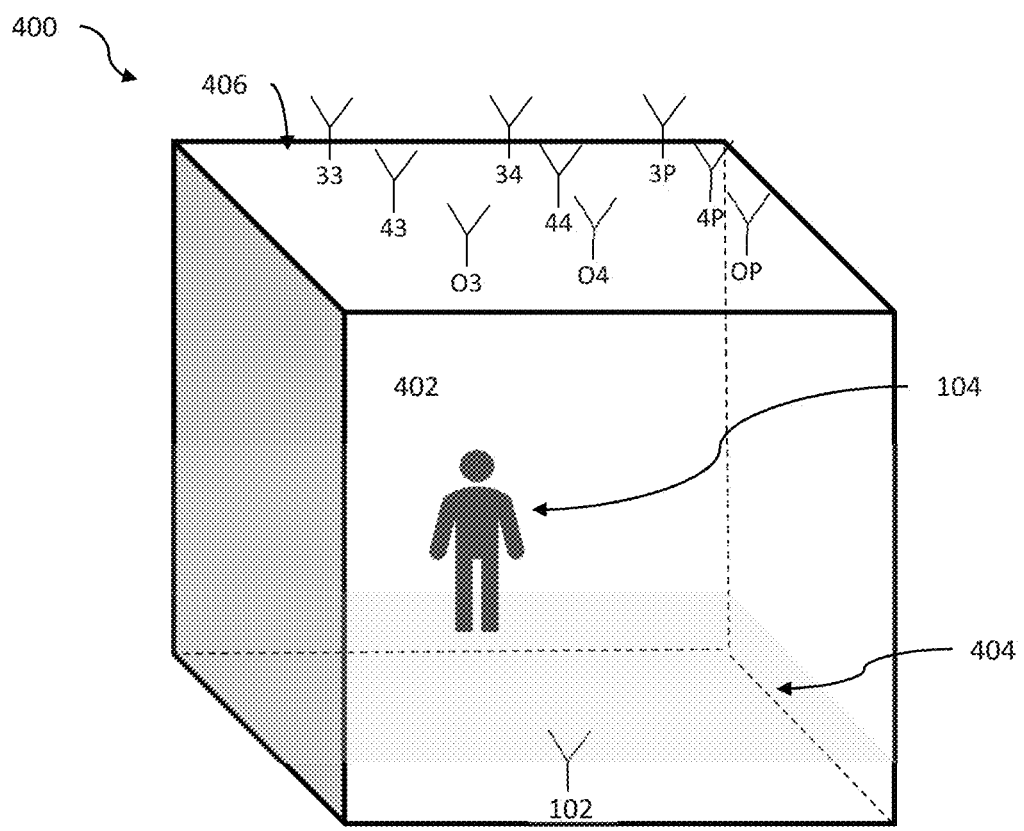

FIG. 2b illustrates a presence detection system 400 installed in a single room 402. The presence detection system 400 comprises a RFID interrogator 102 and a plurality of passive RFID tags 33, 34, . . . , 3P, 43, 44, . . . , 4P, . . . , O3, O4, . . . , OP. As with the system 100 in FIG. 1, the specific number of passive RFID tags is not defined, and the system 400 may be scaled up or down depending on the size of the room and the desired density of RFID tags.

In this case, the RFID interrogator 102 is installed below the floor 404 of the room 402. Installing the RFID interrogator below the floor means that it is not visible to an intruder 104 in the room 402, so cannot be easily detected and tampered with. The passive RFID tags 33 to OP are installed on the ceiling of the room 402. In this case, the passive RFID tags 33 to OP are installed in a void above the ceiling surface 406 such that they are not visible to the intruder 104 within the room 402.

Similarly to the system 300 in FIG. 2a, the presence detection system 400 is configured to detect an intruder 104. The intruder 104 in the room 402 may be proximate to the line of sight between the RFID interrogator 102 and the passive RFID tags 33, 34, 43, and 44. The RFID interrogator 102 is configured to compare the measured RSSI levels for one or more of the passive RFID tags 33, 34, 43, and 44 with their respective reference RSSI values and determine whether the difference between the measured RSSI level and the reference RSSI level is greater than the threshold value for one or more of the passive RFID tags 33, 34, 43, and 44. In this way, the presence detection system 300 is able to detect the intruder 104 in the room 402.

Figure 2C:
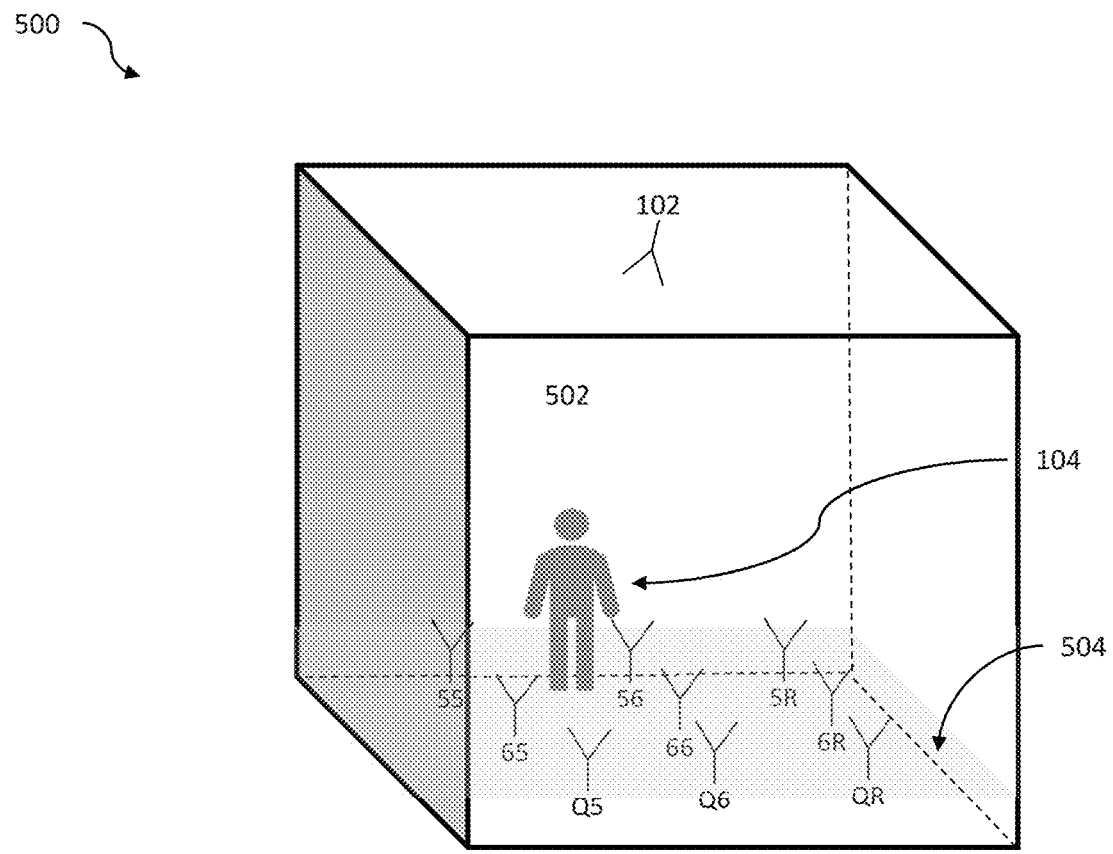

FIG. 2c illustrates a presence detection system 500 installed in a single room 502. The system 500 comprises a RFID interrogator 102 and a plurality of passive RFID tags 55, 56, ..., 5R, 65, 66, ..., 6R, ..., Q5, Q6, ..., QR. As with the system 100 in FIG. 1, the specific number of passive RFID tags is not defined, and the system 500 may be scaled up or down depending on the size of the room and the desired density of RFID tags. This embodiment is similar to the system 400 illustrated by FIG. 2b, except the positions of the RFID interrogator 102 and the passive RFID tags 55 to QR are swapped.

In this case, the RFID interrogator 102 is installed on the ceiling of the room 502 or in a void above the ceiling surface such that the RFID interrogator 102 is not visible to an intruder 104 within the room 502. The passive RFID tags 55 to QR are installed below the floor 504 of the room 502.

Similarly to the system 300 in FIG. 2a, the presence detection system 500 is configured to detect an intruder 104. The intruder 104 in the room 502 may be proximate to the line of sight between the RFID interrogator 102 and the passive RFID tags 55, 56, 65, and 66. The RFID interrogator 102 is configured to compare the measured RSSI levels for one or more of the passive RFID tags 55, 56, 65, and 66 with their respective reference RSSI values and determine whether the difference between the measured RSSI level and the reference RSSI level is greater than the threshold value for one or more of the passive RFID tags 55, 56, 65, and 66. In this way, the presence detection system 300 is able to detect the intruder 104 in the room 502.

Figure 2D:
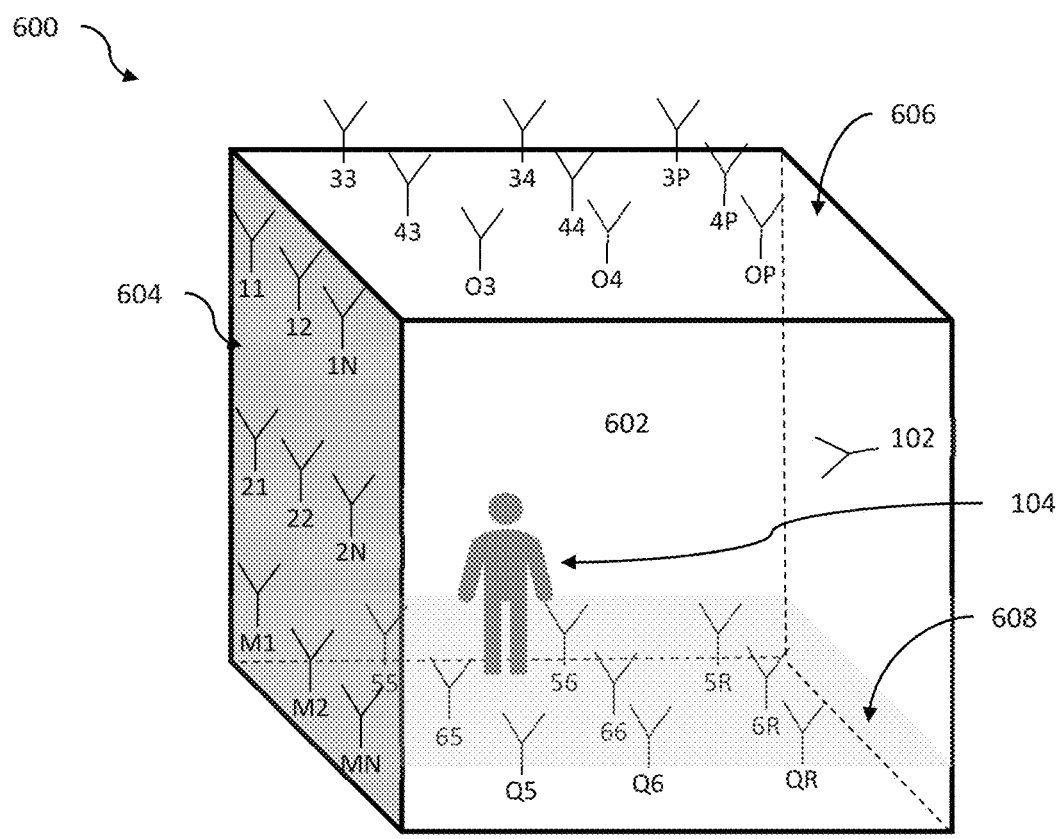

FIG. 2d illustrates a presence detection system 600 installed in a single room 602. The system 600 comprises a RFID interrogator 102 and a plurality of passive RFID tags 11, 12, ..., 1N, 21, 22, ..., 2N, ..., M1, M2, ..., MN, 33, 34, ..., 3P, 43, 44, ..., 4P, ..., O3, O4, ..., OP, 55, 56, ..., 5R, 65, 66, ..., 6R, ..., Q5, Q6, ..., QR. As with the system 100 in FIG. 1, the specific number of passive RFID tags is not defined, and the system 600 may be scaled up or down depending on the size of the room and the desired density of RFID tags.

In this embodiment, passive RFID tags are positioned on a wall 604 of the room 602, on the ceiling 606 of the room 602, and under the floor 608 of the room 602. Passive RFID tags 11 to MN are installed on the wall 604. Passive RFID tags 33 to OP are installed on the ceiling 606. Passive RFID tags 55 to QR are installed under the floor 608. The RFID interrogator 102 is installed on a wall of the room 602 opposite to the wall 604.

Similarly to the system 300 in FIG. 2a, the presence detection system 600 is configured to detect an intruder 104. The intruder 104 in the room 602 may be proximate to or in the line of sight between the RFID interrogator 102 and passive RFID tags on the wall 604, below the floor 608, and on the ceiling 606. For example, the intruder may be proximate to the line of sight between the RFID interrogator 102 an the passive RFID tags 21, 22, M1, M2, 33, 43, 55, and 65. In this case, the RFID interrogator 102 is configured to compare the measured RSSI levels for one or more of the passive RFID tags 21, 22, M1, M2, 33, 43, 55, and 65 with their respective reference RSSI values and determine whether the difference between the measured RSSI level and the reference RSSI level is greater than the threshold value for one or more of the passive RFID tags 21, 22, M1, M2, 33, 43, 55, and 65. In this way, the presence detection system 300 is able to detect the intruder 104 in the room 602.

Figure 3A:
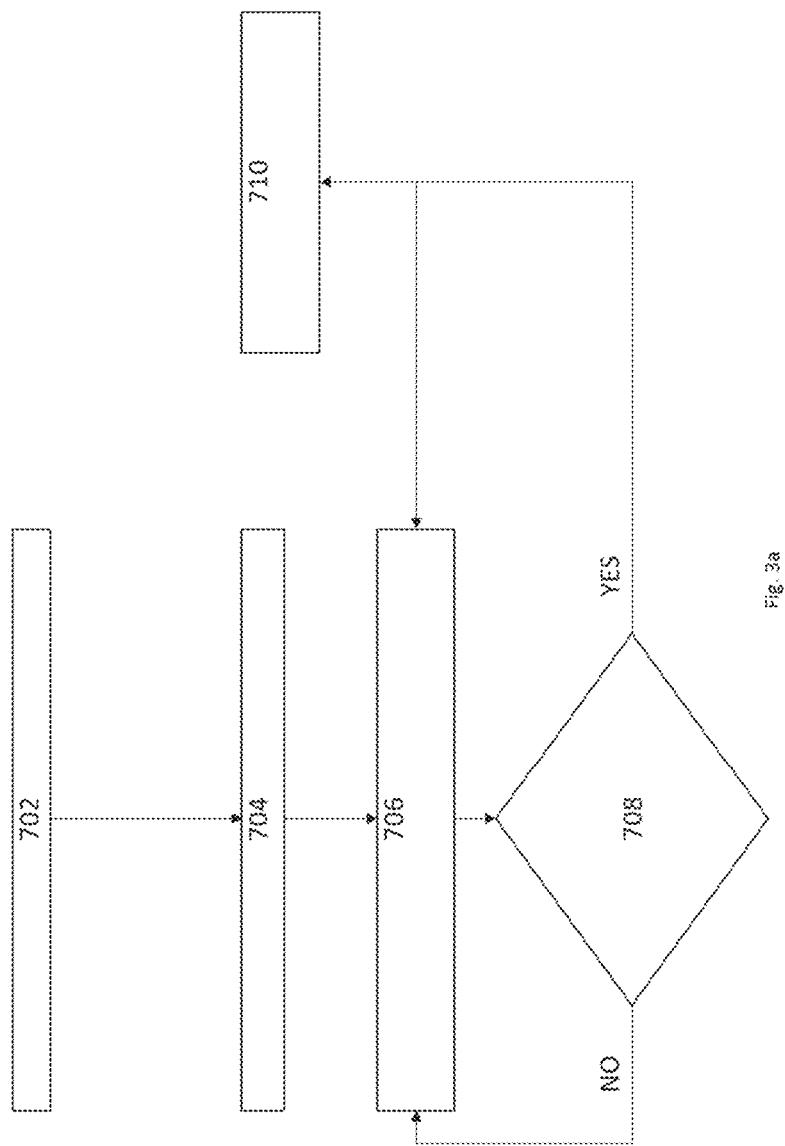
FIGS. 3a and 3b show flowcharts of installation, calibration, and operation steps for a presence detection system.

FIG. 3a shows a flowchart of installation, calibration, and operation steps for a presence detection system. At step 702, a system is installed into the space to be monitored. This comprises placing an RFID interrogator and a plurality of passive RFID tags at locations in the space. The locations may be predefined. The RFID interrogator and/or one or more of the plurality of passive RFID tags may be placed behind a surface of a wall, floor, or ceiling, of the space such that they are not visible to a person within the space being monitored.

At step 704, calibration of the system takes place. Calibration comprises using the RFID interrogator to take reference RSSI levels for each of the installed passive RFID tags within range of the RFID interrogator. To do this, the RFID interrogator emits an electromagnetic signal that is received by each passive RFID tag and induces a current in each passive RFID tag. When a current is induced in a passive RFID tag, the passive RFID tag is then configured to emit a return signal to the RFID interrogator. The RFID interrogator measures the strength of the return signal to determine a RSSI level. The RSSI level is then saved as a reference RSSI level associated with the passive RFID tag. This process is repeated for each passive RFID tag so that each passive RFID tag has a reference RSSI level associated with it.

From step 706, the presence detection system is in operation. During operation, the RFID interrogator measures a RSSI level from each of the plurality of passive RFID tags and compares the measured RSSI level to the reference RSSI level for each of the plurality of passive RFID tags.

At step 708, the RFID interrogator determines whether a difference between the measured RSSI level and the reference RSSI level for any one passive RFID tag is greater than a threshold value for that tag. If not, then the system cycles back to step 706. If the difference is greater than the threshold value, then the method progresses to step 710.

At step 710, the system sends information to security services to alert the security services to a possible intruder. Additionally or alternatively, the system triggers an alarm. The system also cycles back to step 706 to continuously monitor the space in which the system is installed.

Figure 3B:
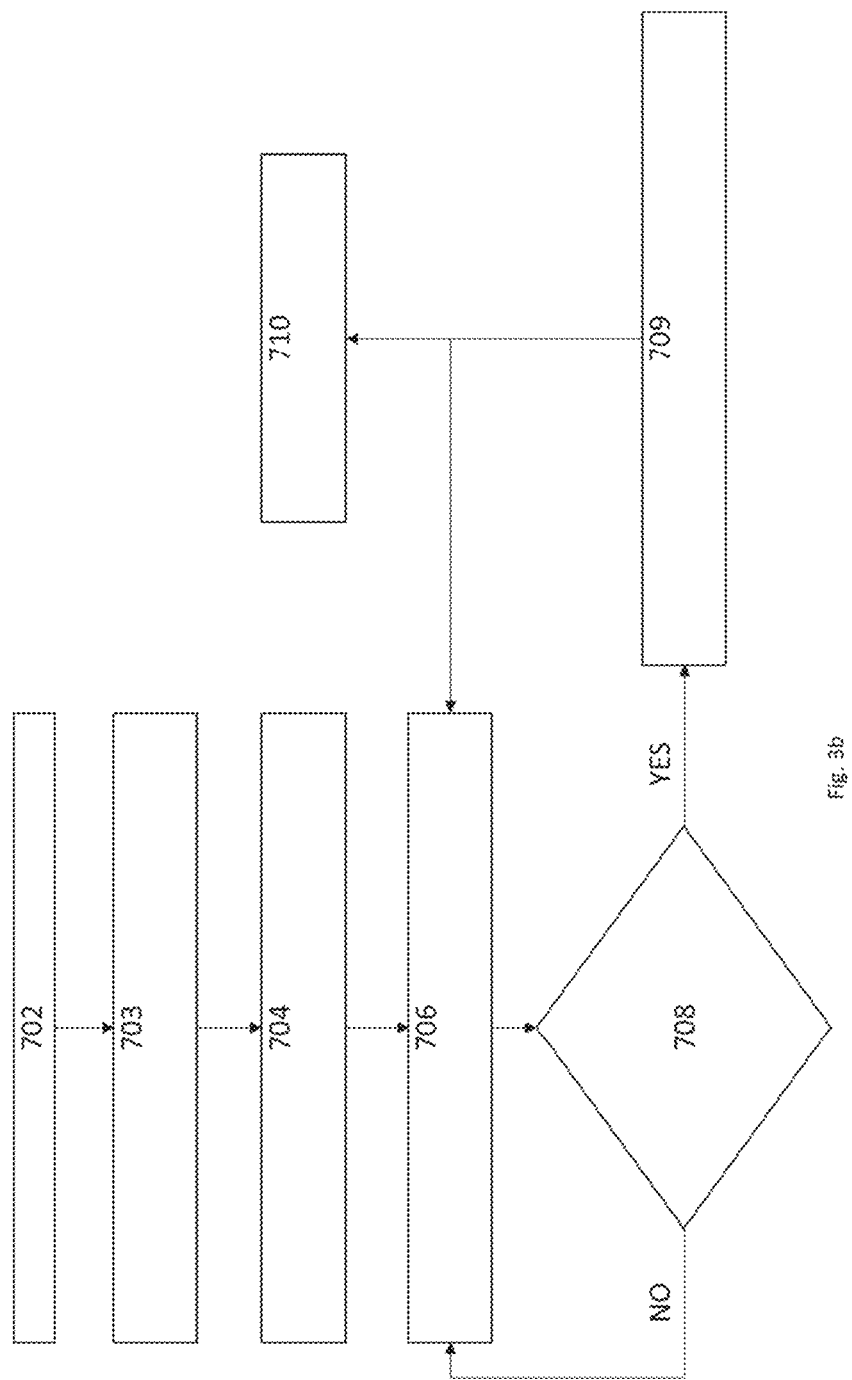

The flowchart in FIG. 3b shows additional steps that may form part of the calibration or operation methods.

At step 703, as part of the calibration method, the method further comprises a step of creating a 2D or 3D map for the passive RFID tags. That is, the RFID interrogator determines the locations of each passive RFID tag and generates a map of their locations. Each passive RFID tag may be assigned coordinates to indicate a location of the tag.

Step 709, as part of the operation method, occurs after the RFID interrogator has determined that a difference between a measured RSSI level and a threshold RSSI level for a passive RFID tag has exceeded a threshold value, but prior to step 710. At step 709, the RFID interrogator uses the map of the location of the passive RFID tags to determine a location of an intruder. That is, by determining which passive RFID tags have threshold values that have been exceeded and checking the corresponding map for the passive RFID tags, the RFID interrogator is able to determine an approximate location of the intruder. This information is then sent to security services at step 710.

What is claimed is:

1. A presence detection system comprising:
   a radio frequency identification (RFID) interrogator; and
   a plurality of passive RFID tags,
   wherein the RFID interrogator is configured to:
   measure a received signal strength indicator (RSSI) level from one or more of the plurality of passive RFID tags;
   compare a measured RSSI level to a reference RSSI level for the one or more of the plurality of passive RFID tags; and
   determine, for the one or more of the plurality of passive RFID tags, whether a difference between the measured RSSI level and the reference RSSI level is greater than a threshold value.

2. The presence detection system of claim 1, wherein the RFID interrogator is configured to trigger an alarm if the difference between the measured RSSI level and the reference RSSI level is greater than the threshold value.

3. The presence detection system of claim 1, wherein the system is for detecting intruders in one or more rooms.

4. The presence detection system of claim 3, wherein the RFID interrogator and the plurality of passive RFID tags are positioned in the one or more rooms such that the RFID interrogator and the plurality of passive RFID tags are not visible to a person from within the one or more rooms.

5. The presence detection system of claim 4, wherein the RFID interrogator and the plurality of passive RFID tags are positioned in predetermined positions in the one or more rooms.

6. The presence detection system of claim 3, wherein the RFID interrogator is configured to count persons entering or exiting one of the one or more rooms by detecting a change in a measured RSSI level proximate to an entrance to the one of the one or more rooms.

7. The presence detection system of claim 1, wherein the RFID interrogator is configured to track a position of a person in a room by detecting a change in a measured RSSI value for the one or more of the passive RFID tags, wherein each of the passive RFID tags has an address and is associated with a location in the room.

8. The presence detection system of claim 1, wherein the threshold value is 5% of the reference RSSI level.

9. The presence detection system of claim 1, wherein the RFID interrogator is configured to detect an authorised RFID tag, wherein the authorised RFID tag is carried by an authorised person or by cargo.

10. The presence detection system of claim 1, wherein the plurality of passive RFID tags comprises over 100 passive RFID tags.

11. The presence detection system of claim 1, wherein the plurality of passive RFID tags is powered by electromagnetic waves received from the RFID interrogator.

12. The presence detection system of claim 1, wherein the presence detection system is configured to detect a presence of intruders, and wherein the presence detection system is configured to track a position of the intruders.

13. A method of presence detection comprising using a presence detection system, the presence detection system comprising:
    a radio frequency identification (RFID) interrogator; and
    a plurality of passive RFID tags,
    wherein the method comprises:
    using the RFID interrogator to measure a received signal strength indicator (RSSI) level from one or more of the plurality of passive RFID tags;
    comparing a measured RSSI level to a reference RSSI level for the one or more of the plurality of passive RFID tags; and
    determining, for the one or more of the plurality of passive RFID tags, whether a difference between the measured RSSI level and the reference RSSI level is greater than a threshold value.

14. A method of calibrating a presence detection system for a room, the presence detection system comprising:
    a radio frequency identification (RFID) interrogator; and
    a plurality of passive RFID tags,
    wherein the method comprises:
    using the RFID interrogator to measure a received signal strength indicator (RSSI) level from one or more of the plurality of passive RFID tags, and
    storing, for the one or more of the plurality of passive RFID tags, the RSSI level as a reference RSSI level.

15. The method of claim 14, wherein the method comprises using the RFID interrogator to identify addresses of each of the plurality of passive RFID tags, and creating a map, using the RFID interrogator, of locations of each of the plurality of passive RFID tags.

* * * * *